(12) United States Patent
Li et al.

(10) Patent No.: US 11,939,486 B2
(45) Date of Patent: Mar. 26, 2024

(54) AQUEOUS DISPERSION OF POLYMERIC PARTICLES

(71) Applicants: Dow Global Technologies LLC, Midland, MI (US); Rohm and Haas Company, Collegeville, PA (US)

(72) Inventors: Yan Li, Shanghai (CN); Junyu Chen, Shanghai (CN); Cheng Shen, Shanghai (CN); James C. Bohling, Lansdale, PA (US); Zhi Juan Gong, Shanghai (CN); Tao Wang, Shanghai (CN)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 424 days.

(21) Appl. No.: 17/270,698

(22) PCT Filed: Oct. 16, 2018

(86) PCT No.: PCT/CN2018/110344
§ 371 (c)(1),
(2) Date: Feb. 23, 2021

(87) PCT Pub. No.: WO2020/077515
PCT Pub. Date: Apr. 23, 2020

(65) Prior Publication Data
US 2021/0332259 A1 Oct. 28, 2021

(51) Int. Cl.
| | | |
|---|---|---|
| *C09D 133/08* | (2006.01) | |
| *C08F 2/22* | (2006.01) | |
| *C08F 212/06* | (2006.01) | |
| *C08F 220/14* | (2006.01) | |
| *C08F 220/18* | (2006.01) | |
| *C08L 43/02* | (2006.01) | |
| *C08L 71/02* | (2006.01) | |
| *C09D 133/12* | (2006.01) | |

(52) U.S. Cl.
CPC .............. *C09D 133/08* (2013.01); *C08F 2/22* (2013.01); *C08F 212/06* (2013.01); *C08F 220/14* (2013.01); *C08F 220/1802* (2020.02); *C08L 43/02* (2013.01); *C08L 71/02* (2013.01); *C09D 133/12* (2013.01); *C08L 2201/54* (2013.01)

(58) Field of Classification Search
CPC ...... C08L 2201/54; C08L 71/02; C08L 43/02; C08F 2/22
See application file for complete search history.

(56) References Cited

U.S. PATENT DOCUMENTS

| | | |
|---|---|---|
| 4,111,881 A | 9/1978 | Paul |
| 5,319,020 A | 6/1994 | Rosenski et al. |
| 6,800,682 B1 | 10/2004 | Windhoevel et al. |
| 8,119,717 B2 | 2/2012 | Anchor |
| 8,580,883 B2 | 11/2013 | Yi-Zhong |
| 8,889,774 B2 | 11/2014 | Yi-Zhong |
| 2005/0107527 A1 | 5/2005 | Holub |
| 2008/0119600 A1 | 5/2008 | Anchor et al. |
| 2008/0188603 A1 | 8/2008 | Porzio et al. |
| 2014/0005095 A1* | 1/2014 | Perdigon .................. C11D 3/43 510/400 |

FOREIGN PATENT DOCUMENTS

| | | |
|---|---|---|
| CN | 106536577 | 3/2017 |
| JP | 06248038 A * | 9/1994 |
| WO | 2008063829 | 5/2008 |
| WO | 2013016402 | 1/2013 |
| WO | 2014158661 | 10/2014 |
| WO | 2018195680 | 11/2018 |
| WO | 2020077515 | 4/2020 |

* cited by examiner

*Primary Examiner* — Wenwen Cai
(74) *Attorney, Agent, or Firm* — Susan M. Zerull

(57) ABSTRACT

An aqueous dispersion of polymeric particles comprising an emulsion polymer and a polyalkylene oxide with a weight average molecular weight in the range of 450 to 1,500 g/mole, and an aqueous coating composition with low VOCs comprising the aqueous dispersion and providing coatings made therefrom with improved water whitening resistance and hardness.

15 Claims, No Drawings

AQUEOUS DISPERSION OF POLYMERIC PARTICLES

FIELD OF THE INVENTION

The present invention relates to an aqueous dispersion of polymeric particles and an aqueous coating composition comprising the same.

INTRODUCTION

Aqueous or waterborne coating compositions are becoming increasingly more important than solvent-based coating compositions for less environmental problems. The coating industry is always interested in developing coating compositions without or with substantially reduced or low volatile organic compounds (VOCs).

In gloss paint applications, binders typically have glass transition temperatures of close to or greater than room temperature, where coalescents and/or solvents are utilized to facilitate film formation. One common approach to minimize VOCs has been to include non-volatile coalescents such as Optifilm Enhancer 400 coalescent from Eastman Chemical Company. However, the use of such non-volatile coalescent has challenges of significantly increased cost and compromised performances like hardness and/or water whitening resistance.

Therefore, there is a need to develop a new type of solvent-free binder suitable for waterborne paint formulations with lower VOC level and improved performances as compared to conventional coalescent-containing paints.

SUMMARY OF THE INVENTION

The present invention provides a novel aqueous dispersion of polymeric particles prepared by incorporation of a specific polyalkylene oxide in the process of polymerization. The aqueous dispersion of the present invention can provide minimum film formation temperature sufficient low to form films at room temperature without requiring the use of a coalescent. An aqueous coating composition comprising such aqueous dispersion has lower VOCs and can provide coatings made therefrom with improved Koenig hardness and water whitening resistance, as compared to coating compositions comprising a combination of a conventional binder and a conventional coalescent at the same loading.

In a first aspect, the present invention is an aqueous dispersion of polymeric particles comprising an emulsion polymer and a polyalkylene oxide with a weight average molecular weight in the range of 450 to 1,500 g/mole, wherein the emulsion polymer comprises structural units of an ethylenically unsaturated phosphorous acid monomer and/or a salt thereof, wherein the polyalkylene oxide has the structure of formula (I),

$$R_1\text{—O-(AO)}_m\text{—}R_2 \qquad (I),$$

where $R_1$ and $R_2$ each independently represent a hydrogen atom or a straight, branched or cyclic, saturated or unsaturated alkyl group having from 1 to 22 carbon atoms; AO represents an oxybutylene unit or a combination of an oxybutylene unit with an oxypropylene unit; and m is an integer of from 5 to 23; and wherein the amount of the polyalkylene oxide in the polymeric particles is 50% or more, by weight based on the total weight of polyalkylene oxides in the aqueous dispersion.

In a second aspect, the present invention is a process of preparing the aqueous dispersion of polymeric particles of the first aspect.

In a third aspect, the present invention is an aqueous coating composition comprising the aqueous dispersion of polymeric particles of the first aspect.

DETAILED DESCRIPTION OF THE INVENTION

"Acrylic" in the present invention includes (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

"Aqueous dispersion of polymeric particles" in the present invention means polymer particles dispersed in an aqueous medium. "Aqueous medium" in the present invention means water and from 0 to 30%, by weight based on the weight of the medium, of water-miscible compound(s) such as, for example, alcohols, glycols, glycol ethers, glycol esters, and the like.

The aqueous dispersion of polymeric particles comprising an emulsion polymer and a polyalkylene oxide may be prepared by polymerization, e.g., emulsion polymerization, of monomers in an aqueous medium in the presence of one or more polyalkylene oxides.

The emulsion polymer useful in the present invention may comprise structural units of one or more ethylenically unsaturated phosphorous acid monomers and/or salts thereof. The ethylenically unsaturated phosphorous acid monomers can be dihydrogen phosphate esters of an alcohol in which the alcohol contains or is substituted with a polymerizable vinyl or olefinic group. The ethylenically unsaturated phosphorous acid monomers may include phosphoalkyl (meth)acrylates such as phosphoethyl (meth)acrylate, phosphopropyl (meth)acrylate, phosphobutyl (meth)acrylate, salts thereof, and mixtures thereof; $CH_2\text{=}C(R)\text{—}C(O)\text{—}O\text{—}(R_pO)_n\text{—}P(O)(OH)_2$, wherein $R\text{=}H$ or $CH_3$, $R_p\text{=}$alkyl and n=1-10, such as SIPOMER PAM-100, SIPOMER PAM-200, and SIPOMER PAM-300 all available from Solvay; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, salts thereof, and mixtures thereof. Preferred ethylenically unsaturated phosphorus-containing monomer is selected from the group consisting of phosphoethyl (meth)acrylate, phosphopropyl (meth)acrylate, phosphobutyl (meth)acrylate, and salts thereof; more preferably, phosphoethyl methacrylate (PEM). The emulsion polymer may comprise, by weight based on the weight of the emulsion polymer, 0.1% or more, 0.2% or more, 0.3% or more, 0.4% or more, 0.5% or more, 0.6% or more, 0.7% or more, 0.8% or more, 0.9% or more, 1% or more, 1.1% or more, or even 1.2% or more, and at the same time, 10% or less, 8% or less, 6% or less, 5% or less, 4.5% or less, 4% or less, 3.5% or less, 3% or less, 2.5% or less, 2% or less, or even 1.5% or less, of structural units of the ethylenically unsaturated phosphorous acid monomer and/or salt thereof. Weight of the emulsion polymer herein in the present invention refers to the dry weight of the emulsion polymer.

The emulsion polymer useful in the present invention may comprise structural units of one or more ethylenically unsaturated monomers carrying at least one functional group selected from the group consisting of amide, carboxyl, carboxylic anhydride, sulphonate, sulphate, or mixtures thereof. Suitable ethylenically unsaturated monomers carrying at least one functional group may include, for example, α, β-ethylenically unsaturated carboxylic acids or anhydrides thereof such as (meth)acrylic acid, itaconic acid (IA), fumaric acid, (meth)acrylic anhydride, maleic anhydride, or mixtures thereof; sodium styrene sulfonate (SSS), sodium vinyl sulfonate (SVS), 2-acrylamido-2-methylpropanesulfonic acid (AMPS), methacrylamide, acrylamide, or mixtures thereof. Preferred ethylenically unsaturated monomers carrying at least one functional group include methacrylamide, acrylamide, or mixtures thereof. The emulsion polymer may comprise, by weight based on the weight of the emulsion polymer, zero or more, 0.1% or more, 0.2% or more, 0.3% or more, 0.4% or more, 0.5% or more, 0.6% or more, 0.7% or more, 0.8% or more, or even 1.0% or more, and at the same time, 10% or less, 8% or less, 6% or less, 5% or less, 4% or less, 3.5% or less, 3% or less, 2.5% or less, 2.2% or less, 2% or less, 1.8% or less, 1.5% or less, or even 1.2% or less, of structural units of the ethylenically unsaturated monomer carrying at least one functional group.

The emulsion polymer useful in the present invention may comprise structural units of one or more monoethylenically unsaturated nonionic monomers that are different from the monomers described above. "Nonionic monomers" herein refers to monomers that do not bear an ionic charge between pH=1-14. The monoethylenically unsaturated nonionic monomers may include alkyl esters of (methyl) acrylic acids with an alkyl having from 1 to 20 carbon atoms, from 1 to 10 carbon atoms, or from 1 to 8 carbon atoms. Examples of suitable monoethylenically unsaturated nonionic monomers include methyl acrylate, methyl methacrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate, or combinations thereof; (meth)acrylonitrile; ureido-functional monomers such as hydroxyethyl ethylene urea methacrylate; monomers bearing acetoacetate-functional groups such as acetoacetoxyethyl methacrylate (AAEM); monomers bearing carbonyl-containing groups such as diacetone acrylamide (DAAM); vinyl aromatic monomers including styrene and substituted styrene such as .alpha.-methyl styrene, p-methyl styrene, t-butyl styrene, vinyltoluene, or mixtures thereof; butadiene; α-olefins such as ethylene, propylene, and 1-decene; vinyl acetate, vinyl butyrate, vinyl versatate and other vinyl esters; glycidyl (meth)acrylate; or combinations thereof. Preferred monoethylenically unsaturated nonionic monomers are selected from the group consisting of methyl methacrylate, ethyl acrylate, butyl acrylate, 2-ethylhexyl acrylate, styrene, or mixtures thereof. The emulsion polymer may comprise, by weight based on the weight of the emulsion polymer, 50% or more, 60% or more, 70% or more, 80% or more, 90% or more, or even 95% or more, and at the same time, 99.5% or less, 99% or less, or even 98% or less, of structural units of the monoethylenically unsaturated nonionic monomers.

The emulsion polymer useful in the present invention may further comprise structural units of one or more multiethylenically unsaturated monomers. Suitable multiethylenically unsaturated monomers may include alkylene glycol diacrylates and dimethacrylates such as, for example, ethylene glycol di(meth)acrylate, butylene glycol di(meth)acrylate, 1,1,1-trimethylol propane di(meth)acrylate, or pentaerythritol trimethacrylate; divinyl benzene, vinyl (meth)acrylate; allyl(meth)acrylate, N, N-methylene bisacrylamide, and the like; or mixtures thereof. The emulsion polymer may comprise, by weight based on the weight of the emulsion polymer, zero or more, 0.1% or more, 0.2% or more, or even 0.5% or more, and at the same time, 5% or less, 4% or less, 3% or less, 2% or less, or even 1% or less, of structural units of the multiethylenically unsaturated monomer.

Total weight concentration of the structural units described above in the emulsion polymer may be equal to 100%. Types and levels of the monomers described above may be chosen to provide the obtained emulsion polymer with a glass transition temperature ($T_g$) suitable for different applications. The polymeric particles may have a measured Tg in the range of from −60 to 100° C., from −20 to 50° C., from −10 to 30° C. By "measured Tg" as used herein, is meant the glass transition temperature as determined by differential scanning calorimetry (DSC) according to the test method described in the Examples section below.

The polymeric particles in the aqueous dispersion also comprise one or more polyalkylene oxides. The polyalkylene oxides useful in the present invention may have the structure of formula (I),

$$R_1\text{—}O\text{-}(AO)_m\text{—}R_2 \qquad (I),$$

wherein $R_1$ and $R_2$ each independently represent a hydrogen atom or a straight, branched or cyclic, saturated or unsaturated alkyl group having 1 to 22 carbon atoms; AO represents an oxybutylene unit (—$C_4H_8O$—), or its combination with an oxypropylene unit (—$C_3H_6O$—); and m is an integer of from 5 to 23, preferably from 5 to 15. In some embodiments, at least one of $R_1$ and $R_2$ is the alkyl group, preferably having from 4 to 12 carbon atoms. In some further embodiments, one of $R_1$ and $R_2$ is an alkyl group having from 4 to 12 carbon atoms, and the other one is a hydrogen atom. Preferably, AO represents a combination of the oxybutylene unit and the oxypropylene unit, i.e., the polyalkylene oxide is a polyproxylene oxide-polybuthylene oxide copolymer. The polyalkylene oxides can be block or random polymers. Preferred polyalkylene oxide is a block or random polyproxylene oxide-polybuthylene oxide copolymer.

The polyalkylene oxide useful in the present invention may comprise from zero to 90% by weight units derived from propylene oxide and from 100% to 10% by weight units derived from butylene oxide. For example, the amount of units derived from butylene oxide (i.e., oxybutylene units) may be 10% or more, 15% or more, 20% or more, 25% or more, 30% or more, 35% or more, 40% or more, or even 45% or more, and at the same time, 100% or less, 95% or less, 90% or less, 85% or less, 80% or less, 70% or less, 65% or less, 60% or less, 55% or less, or even 50% or less, by weight based on the total weight of the oxybutylene units and oxypropylene units. The amount of units derived from propylene oxide (i.e., oxypropylene units) may be zero or more, 5% or more, 10% or more, 15% or more, 20% or more, 30% or more, 35% or more, 40% or more, or even 45% or more, and at the same time, 90% or less, 85% or less, 80% or less, 75% or less, 70% or less, 65% or less, or even 60% or less, by weight based on the total weight of the oxybutylene units and oxypropylene units.

The polyalkylene oxides useful in the present invention may have a weight average molecular weight of 1,500 g/mole or less, for example, 450 g/mole or more, 500 g/mole or more, 550 g/mole or more, 600 g/mole or more, 620 g/mole or more, 650 g/mole or more, 680 g/mole or more, 700 g/mole or more, 720 g/mole or more, or even 750 g/mole or more, and at the same time, 1,500 g/mole or less, 1,400 g/mole or less, 1,300 g/mole or less, 1,200 g/mole or less, 1,100 g/mole or less, 1,000 g/mole or less, 980 g/mole or less, 950 g/mole or less, 920 g/mole or less, 900 g/mole or less, 880 g/mole or less, 850 g/mole or less, 820 g/mole or less, 800 g/mole or less, 780 g/mole or less, or even 770 g/mole or less. Weight average molecular weight may be determined by Gel Permeation Chromatography (GPC) as described in the Examples section below.

The polyalkylene oxides in the polymeric particles may be present an amount of 0.5% or more, 1% or more, 1.5% or more, 2% or more, 2.5% or more, 3% or more, 3.5% or more, 4% or more, 4.5% or more, 5% or more, 5.5% or more, 5.5% or less, 6% or more, 6.5% or less, 7% or more, 7.5% or more, 8% or more, 8.5% or more, 9% or more, 9.5% or more, or even 10% or more, and at the same time, 30% or less, 28% or less, 26% or less, 25% or less, 24% or less, 22% or less, 20% or less, 19% or less, 18% or less, 17% or less, 16% or less, 15% or less, 14% or less, 13% or less, 12% or less, or even 11% or less, by weight based on the weight of the emulsion polymer in the polymeric particles.

The polymeric particles in the aqueous dispersion may have an average particle size of from 30 to 500 nanometers (nm), from 50 to 300 nm, or from 80 to 200 nm. The particle size herein refers to Z-average size and may be measured by a Brookhaven BI-90 Plus Particle Size Analyzer.

The aqueous dispersion of polymeric particles of the present invention may be prepared by polymerization, preferably emulsion polymerization, of the monomers described above, in an aqueous medium in the presence of the polyalkylene oxide. The polyalkylene oxide may be added prior to or during the polymerization of the monomers, or combinations thereof. The polyalkylene oxide may be added into the monomers, or added into a polymer seed (for example, a polystyrene seed) to be shot into a reactor, or dispersed in the monomers. In one embodiment, the polyalkylene oxide is mixed with the monomers prior to polymerization of the monomers. Without being bound by a theory, after polymerization process, all of or the major part of the polyalkylene oxides are attached to the surface of the polymeric particles and/or embedded in the polymeric particles (all named as "polyalkylene oxide in the polymeric particles"). A small amount of polyalkylene oxides may be optionally present in the aqueous medium of the obtained aqueous dispersion after the preparation of the polymeric particles. For example, the polyalkylene oxides in the polymeric particles may be present in an amount of 50% or more, 55% or more, 60% or more, 65% or more, 70% or more, 75% or more, 80% or more, 85% or more, 87% or more, 90% or more, 95% or more, 97% or more, 98% or more, 99% or more, or even 100%, by weight based on the total weight of polyalkylene oxides in the aqueous dispersion (i.e., total weight of the polyalkylene oxides in the polymeric particles and in the aqueous medium of the aqueous dispersion).

The monomers may be added neat or as an emulsion in water; or added in one or more additions or continuously, linearly or nonlinearly, over the reaction period of preparing the polymeric particles. Total weight concentration of the monomers described above for preparing the polymeric particles may be equal to 100%. The dosage of such monomer based on the total weight of the monomers, is substantially the same as the amount of each of these monomers as structural units in the emulsion polymer, based on the weight of the emulsion polymer.

Temperature suitable for polymerization of the monomers may be lower than 100° C., in the range of from 30 to 95° C., or in the range of from 50 to 92° C. Multistage emulsion polymerization using the monomers described above can be used, which at least two stages are formed sequentially, and usually results in the formation of the multistage polymer comprising at least two polymer compositions.

Free radical initiators may be used in the polymerization process. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of the monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

One or more surfactants may be used in the polymerization process. The surfactant may be added prior to or during the polymerization of the monomers, or combinations thereof. A portion of the surfactant can also be added after the polymerization. These surfactants may include anionic and/or nonionic emulsifiers. The surfactants can be reactive surfactants, e.g., polymerizable surfactants. Examples of suitable surfactants include alkali metal or ammonium salts of alkyl, aryl, or alkylaryl sulfates, sulfonates or phosphates; alkyl sulfonic acids; sulfosuccinate salts; fatty acids; and ethoxylated alcohols or phenols. Preferably, the alkali metal or ammonium salts of alkyl, aryl, or alkylaryl sulfates surfactant are used. The surfactant used is usually from zero to 10%, from 0.5% to 3%, or from 0.8% to 1.5%, by weight based on the total weight of the monomers.

One or more chain transfer agents may be used in the polymerization process. Examples of suitable chain transfer agents include 3-mercaptopropionic acid, n-dodecyl mercaptan, methyl 3-mercaptopropionate, butyl 3-mercaptopropionate, benzenethiol, azelaic alkyl mercaptan, or mixtures thereof. The chain transfer agent may be used in an effective amount to control the molecular weight of the emulsion polymer. The chain transfer agent may be used in an amount of from zero to 5%, from 0.05% to 1%, or from 0.1% to 0.3%, by weight based on the total weight of the monomers.

After completing the polymerization process, the obtained aqueous dispersion may be neutralized by one or more bases to a pH value, for example, at least 7, from 7 to 10, or from 8 to 9. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, di-npropylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof. The aqueous dispersion of the present invention may have a solids content of from 20% to 70% by weight or from 40% to 60% by weight.

The aqueous dispersion of the present invention demonstrates good film formation property at room temperature. For example, the aqueous dispersion of the present invention demonstrates lower minimum film formation temperature (MFFT) as compared to polyalkylene oxide-free binders or a blend of the emulsion polymer with the polyalkylene oxide. The MFFT is the lowest temperature at which the polymer particles of the aqueous dispersion will mutually coalesce and form a continuous film when the volatile component (e.g., water) evaporates. The MFFT can be determined according to the test method described in the Examples section below.

The aqueous dispersion of polymeric particles of the present invention is useful for use in coating applications without requiring the use of a coalescent. The aqueous dispersion of the present invention can provide coating films with comparable properties such as, for example, hiding, whiteness, gloss, scrub resistance, and/or stain resistance, as compared to coating compositions comprising a conventional binder and a high VOC coalescent as defined by ISO17895-2005, such as Texanol ester alcohol from Eastman Chemical Company. The aqueous dispersion of the present invention may also provide coating films with improved Koenig hardness and water whitening resistance while not requiring a coalescent, in comparison with coating compositions comprising a conventional binder and a typical zero VOC coalescent (as defined by ISO17895-2005) such as OE-400 from Eastman Chemical Company at the same loading.

The aqueous coating composition of the present invention comprises the aqueous dispersion of polymeric particles. The aqueous dispersion of polymeric particles may be present, by solids or dry weight based on the dry weight of the aqueous coating composition, in an amount of from 5% to 85%, from 7% to 65%, or from 10% to 50%.

The aqueous coating composition of the present invention may optionally comprise one or more coalescents. "Coalescent" herein means a compound that is able to aid dispersed polymer particles to form a homogeneous coating film by reducing the film formation temperature of the polymer. The coalescent typically has a molecular weight less than 410. Examples of suitable coalescents include ethylene glycol ethyl ether, ethylene glycol propyle ether, ethylene glycol butyl ether, ethylene glycol hexyl ether, diethylene glycol methyl ether, diethylene glycol ethyl ether, diethylene glycol butyl ether, diethylene glycol hexyl ether, propylene glycol n-butyl ether, dipropylene glycol n-butyl ether, dipropylene glycol methylene ether, tripropylene glycol methyl ether, propylene glycol phenyl ether, propylene glycol tert-butyl ether, 2,2,4-thimethyl-1,3-pentanediol monoisobutyrate, 2,2,4-trimethyl-1,3-pentanediol diisobutyrate, or mixtures thereof. Commercially available coalescents may include, for example, Texanol ester alcohol, OE-300, and OE-400 coalescents all from Eastman Chemical Company, COASOL coalescent from Chemoxy International, or mixtures thereof. The amount of the coalescent in the aqueous coating composition may be less than 5%, less than 4.5%, less than 4%, less than 3.5%, less than 3%, less than 2.5%, less than 2%, less than 1.8%, less than 1.5%, less than 1.2%, less than 1%, less than 0.8%, less than 0.5%, or even less than 0.1%, by weight based on the dry weight of the aqueous dispersion of polymeric particles. Preferably, the aqueous coating composition is substantially free of the coalescent.

The aqueous coating composition of the present invention may also comprise one or more pigments. As used herein, the term "pigment" refers to a particulate inorganic material which is capable of materially contributing to the opacity or hiding capability of a coating. Such materials typically have a refractive index greater than 1.8 and include inorganic pigments and organic pigments. Examples of suitable inorganic pigments include titanium dioxide ($TiO_2$), zinc oxide, zinc sulfide, iron oxide, barium sulfate, barium carbonate, or mixtures thereof. Preferred pigment used in the present invention is $TiO_2$. $TiO_2$ may be also available in concentrated dispersion form. The aqueous coating composition may also comprise one or more extenders. The term "extender" refers to a particulate inorganic material having a refractive index of less than or equal to 1.8 and greater than 1.3. Examples of suitable extenders include calcium carbonate, aluminium oxide ($Al_2O_3$), clay, calcium sulfate, aluminosilicate, silicate, zeolite, mica, diatomaceous earth, solid or hollow glass, ceramic bead, and opaque polymers such as ROPAQUE™ Ultra E available from The Dow Chemical Company (ROPAQUE is a trademark of The Dow Chemical Company), or mixtures thereof. The aqueous coating composition may have a pigment volume concentration (PVC) of from 10% to 75%, from 15% to 65%, or from 18% to 60%. PVC of a coating composition may be determined according to the following equation:

$$PVC = \frac{\text{pigment volume} + \text{extender volume}}{\text{pigment volume} + \text{extender volume} + \text{binder volume}} * 100\%$$

The aqueous coating composition of the present invention may comprise one or more matting agents. "Matting agents" herein refer to any inorganic or organic particles that provide matt effect. The matting agents may be selected from silica matting agents, diatomate, polyurea matting agents, polyacrylate, polyethylene, polytetrafluoroethene, or mixtures thereof. Suitable commercially available matting agents may include, for example, CELITE 499 available from World Minerals Co. Ltd, ACEMATT TS-100 and ACEMATT OK520 silica matting agents both available from Evonik, DEUTERON MK polyurea matting agent available from Deuteron, micronized wax additives CERAFLOUR 929 and CERAFLOUR 920 both available from BYK, SYLOID Silica 7000 matting agent available from Grace Davison; or mixtures thereof. The matting agent may be present, by solids weight based on the total weight of the aqueous coating composition, in an amount of from zero to 10%, from 0.1% to 8%, or from 0.5% to 5%.

The aqueous coating composition of the present invention may further comprise one or more defoamers. "Defoamers" herein refers to chemical additives that reduce and hinder the formation of foam. Defoamers may be silicone-based defoamers, mineral oil-based defoamers, ethylene oxide/propylene oxide-based defoamers, alkyl polyacrylates, or mixtures thereof. The defoamer may be present, by weight based on the total weight of the aqueous coating composition, in an amount of from zero to 2%, from 0.1% to 1.5%, or from 0.2% to 1%.

The aqueous coating composition of the present invention may further comprise one or more thickeners (also known as "rheology modifiers"). The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydroxypropyl cellulose. Preferred thickener is based on HEUR. The thickener may be present, by weight based on the total weight of the aqueous coating composition, in an amount of from zero to 4%, from 0.1% to 3%, or from 0.2% to 2%.

The aqueous coating composition of the present invention may further comprise water. The concentration of water may be, by weight based on the total weight of the aqueous coating composition, in amount of from 30% to 90%, from 35% to 80%, or from 40% to 70%.

In addition to the components described above, the aqueous coating composition of the present invention may further comprise any one or combination of the following additives: buffers, neutralizers, dispersants, humectants, biocides, anti-skinning agents, colorants, flowing agents, antioxidants, leveling agents, thixotropic agents, adhesion promoters, anti-scratch additives, and grind vehicles. These additives may be present in a combined amount of from zero to 10%, from 0.1% to 6%, or from 0.2% to 4%, by weight based on the total weight of the aqueous coating composition.

The aqueous coating composition of the present invention may be prepared with techniques known in the coating art. The process of preparing the aqueous coating composition may comprise admixing the aqueous dispersion of polymeric particles with other optional components as described above. Components in the aqueous coating composition may be mixed in any order to provide the aqueous coating composition of the present invention. Any of the above-mentioned optional components may also be added to the composition during or prior to the mixing to form the aqueous coating composition.

The aqueous coating composition of the present invention can be applied to a substrate by incumbent means including brushing, dipping, rolling and spraying. The aqueous coating composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the aqueous coating composition has been applied to a substrate, the aqueous coating composition may be dried, or be allowed to dry, at 5-35° C., or at an elevated temperature, for example, from 35 to 90° C. to form a film (this is, coating).

The aqueous coating composition of the present invention shows significantly reduced VOC emission and can provide coatings made therefrom with improved water whitening resistance and Koenig hardness without compromising film formation, hiding, gloss, and scrub resistance properties, as compared to coating compositions comprising a conventional binder and a conventional coalescent. The aqueous coating composition of the present invention can be applied to, and adhered to, various substrates. Examples of suitable substrates include concrete, cementious substrates, wood, metals, stones, elastomeric substrates, glass or fabrics. The coating composition is suitable for various coating applications, such as architecture coatings, marine and protective coatings, automotive coatings, wood coatings, coil coatings, and civil engineering coatings. The aqueous coating composition can be used alone, or in combination with other coatings to form multi-layer coatings.

EXAMPLES

Some embodiments of the invention will now be described in the following Examples, wherein all parts and percentages are by weight unless otherwise specified.

Methyl methacrylate (MMA), styrene (St), and 2-Ethylhexyl acrylate (EHA) are all available from Shanghai Lang Yuan Chemical Co., Ltd.

Acrylamide (AM) is available from Shanghai Chemical Reagent Co., Ltd.

Phosphoethyl methacrylate (PEM) is available from Solvay.

(n-Methacryloxyoxyethyl) ethylethylene urea (MEU) is available from Solvay.

SYNALOX™ OA-25 polyalkylene glycol (OA-25), available from The Dow Chemical Company, is a $C_4$ alkyl terminated copolymer of butylene oxide and propylene glycol, having a weight average molecular weight 750 g/mole.

UCON™ OSP-32 polyalkylene glycol (OSP-32), available from The Dow Chemical Company, is a $C_{12}$ alkyl terminated copolymer of butylene oxide and propylene glycol, having a weight average molecular weight of 765 g/mole.

UCON™ OSP-46 polyalkylene glycol (OSP-46), available from The Dow Chemical Company, is a $C_{12}$ alkyl terminated copolymer of butylene oxide and propylene glycol, having a weight average molecular weight of 950 g/mole.

UCON™ OSP-150 polyalkylene glycol (OSP-150), available from The Dow Chemical Company, is a $C_{12}$ alkyl terminated copolymer of butylene oxide and propylene glycol, having a weight average molecular weight of 1,850 g/mole.

Disponil Fes 32 surfactant (FES-32) (solids: 31%), available from Cognis, is a sodium salt of fatty alcohol ether sulphate.

Ammonia persulfate (APS) (solids: 97%) used as an initiator, tert-Butyl hydroperoxide (t-BHP) (solids: 70%) used as a chaser catalyst, and isoascorbic acid (IAA) used as a chase activator are all available from Shanghai Chemical Reagent Co., Ltd.

NATROSOL 250 HBR (250 HBR), available from Ashland Aqualon Company, is a rheology modifier.

TERGITOL™ EF-406 (70%), available from The Dow chemical Company, is a nonionic surfactant.

OROTAN™ 1288 Dispersant (45%), available from The Dow Chemical Company, is a polymethacrylic acid type dispersant.

Rhodoline FT-100 (100%), available from Solvay S.A., is an additive for waterborne paints to improve freeze-thaw stability.

Nopco NXZ defoamer is available from Nopco Company.

Ti-Pure R-706, available from The Chemours Company, is titanium dioxide ($TiO_2$).

Celite 499, available from Imerys Company, is a diatomite used as a matting agent.

CC-700, available from Guangfu Building Materials Fine Chemicals Industry Co, Ltd., is calcium carbonate.

ASP 170, available from BASF, is hydrous aluminum silicate.

DB-80, available from Bright Industrial Co. Ltd., is calcined clay.

Optifilm Enhancer 400 (OE-400) coalescent is available from Eastman Chemical Company.

Texanol ester alcohol, available from Eastman Chemical Company, is trimethylpentanediol isobutyrate.

ROPAQUE Ultra E Opaque Polymer (Ultra E polymer) is available from The Dow Chemical Company.

ACRYSOL™ TT-935 (50%), available from The Dow Chemical Company, is a hydrophobically modified alkali swellable emulsion (HASE) thickener.

KATHON™ LXE biocide is available from The Dow Chemical Company.

SYNALOX, UCON, TERGITOL, ACRYSOL, OROTAN, and KATHON are all trademarks of The Dow Chemical Company.

The following standard analytical equipment and methods are used in the Examples.

GPC Analysis

The molecular weight of a sample (e.g., polyalkylene glycols) was determined by GPC. The GPC analysis was calibrated using a polyol mixture (1.5% by weight in tetrahydrofuran (THF)) and the calibrated molecular weight Mw calculation was based on a broad standard method. The polyol mixture was obtained by adding 15 milligrams (mg) of VORANOL™ CP6001, VORANOL CP4100, VORANOL P2000, and VORANOL CP1000 (all available from The Dow Chemical Company) in 1 gram (g) of THF (VORANOL is a trademark of The Dow Chemical Company).

150±20 mg of the sample was weighed into a 20 mL vial and 10 mL THF (HPLC grade, LabScan) was added. The vials were sealed with butyl rubber septum and the vials were shaken. Instrumental conditions are given in the table below:

| GPC conditions | | | |
|---|---|---|---|
| HPLC system | | Settings | |
| Degasser | Agilent G1379A; 2 channels in series | | |
| Pump/eluent | Agilent 1100 G1310A; isocratic/THF | Flow (ml/min) | 1 |
| Autosampler | Agilent 1100 G1313A | Injection volume (μl) | 50 |
| Column oven | Shimadzu column box CTO-10A VP | Oven temperature (° C.) | 35 |
| Column | Series of 4 PL-Gel (7 mm × 30 cm × 5 μm) columns, each filled with PS/DVB (poly(styrene-co-divinylbenzene)) of 50, 100, 500 and 1000 Å | | |
| Refractive Index (RI) Detector | Agilent 1100 Differential Refractive Index Detector G1362A | Peak width (min) | >0.2 |
| | | RI temperature (° C.) | 35 |

Minimum Film Formation Temperature (MFFT) Test

The MFFT was determined using a Rhopoint MFFT Bar-90 with a bar with a gradient temperature ranging from 0 to 60° C. A tape was put down onto the bar followed by drawing down an aqueous dispersion to be tested to the tape to form a 75 μm wet film. After 2 hours, the tape was manually pulled off the bar to observe mechanical failure of the film. The minimum temperature at which the film becomes discontinuous was recorded as the MFFT.

Measured Glass Transition Temperature (Tg)

The measured Tg was determined by DSC. A 5-10 mg sample was analyzed in a sealed aluminum pan on a TA Instrument DSC Q2000 fitted with an auto-sampler under nitrogen atmosphere. Tg measurement by DSC was with three cycles including, from –60 to 150° C., 10° C./min ($1^{st}$ cycle, then hold for 5 minutes to erase thermal history of the sample), from 150 to –60° C., 10° C./min ($2^{nd}$ cycle), and from –60 to 150° C., 10° C./min ($3^{rd}$ cycle). Tg was obtained from the $3^{rd}$ cycle by "half height" method.

Water Whitening Resistance

Coating composition samples to be tested were first prepared and kept at room temperature for 12 hours. Each sample was drawn down on a vinyl chart with a wet thickness of 100 μm and then cured at room temperature for 12 hours. The coated vinyl chart was dipped into distilled water for seven days, and then color change of the coating film on the vinyl chart was visually observed. The water whitening resistance performance of coating films was rated according to the whiteness of the clear film as follows,

| Score | Appearance |
|---|---|
| 5 | No whitening |
| 4 | A little whitening |
| 3 | Slightly whitening |
| 2 | Partially whitening |
| 1 | All whitening |

Koenig Hardness

Coated panels were prepared by applying a test coating composition onto Q panels (cold rolled steel) by a 100 μm applicator. The coated panels were then allowed to dry at 23° C. and RH of 50% for 1 hour. Pendulum (Koenig) Hardness was tested in accordance with ASTM D4366-95 (Amplitude limit: 6° to 3° and Period of oscillation: 1.4 seconds) and reported in second (s).

Contrast Ratio (C.R.)

The contrast ratio, which is a measure of hiding, correlates well with visual impressions of hiding. The contrast ratio was tested according to the following steps:

A paint formulation was casted with a 100 μm film applicator onto a white-black chart (5C opacity chart) and allowed to dry for 1 day. Y-reflectance values in three areas over both the white and black areas, respectively, of the 5C opacity chart were measured. The contrast ratio was reported as the ratio of Average Reflectance over Black/Average Reflectance over White.

Gloss

A paint formulation was casted with a 100 μm film applicator onto a white-black chart (5C opacity chart) and allowed to dry for 1 day. Then 20/60/85 degree gloss, respectively, was tested by a micro-TRI-gloss meter from BYK Gardner on the white part of the chart.

Scrub Resistance

The scrub resistance was measured according to ASTM Test Method D 2486-74A (2006). A paint formulation was coated with a 7 mil (175 μm) film caster on a black vinyl scrub chart (Type P-121-10N, The Leneta Company), and then air dried in a horizontal position for 7 days in a Constant Temperature Room (CTR, 23±2° C. and 50±5% relative humidity). The scrub test was performed on a Sheen machine Model REF903 equipped with a metal tray and nylon bristle brush. A brush was soaked in water overnight before use, and was then mounted in a holder with the brush's bristle-side down to start the test. Ten grams of abrasive scrub medium (Type SC-2, The Leneta Company) were applied on brush surface. The number of cycles needed to completely remove the coating film in one continuous line was recorded. The number of cycles for a coating composition comprising OE-400 as a coalescent (Comp Paints A-I) was recorded as 100%, and the number of cycles for other examples were relative percentage values compared to that of Comp Paint A-I. A relative percentage higher than 95% means acceptable scrub resistance. Higher relative percentage means better scrub resistance.

Stain Resistance

To test stain resistance performance, a test paint formulation was coated on Leneta P-121-10N black vinyl charts with wet film thickness of 7 mil (175 μm). The resultant coating films were allowed to dry for 7 days in a constant temperature room (CTR, 25° C., 50% relative humidity). Different stains including mark pen, pen, pencil, crayon, green tea, yellow tea, coffee, vinegar, and blue ink, respectively, were then applied across the surface of the coating films, respectively, allowing the stains to soak into the films for 3 hours. Then, the stain removal test was conducted on a modified scrub machine with a boat filled with a 3M commercial sponge saturated with 1% household detergent solution. 1 kilogram weight was placed on the boat to ensure that all the samples were tested under the same pressure. Each sample was washed using the 3M sponge described above for 200 cycles. Before ranking for stain resistance, the sample charts were rinsed using water followed by complete drying at room temperature. The stain resistance score for each stain, on a scale of 1 to 10, was evaluated by visual ranking percentages of stain removal by comparing with the unscrubbed side, based on the standard described in the table below. The stain resistance of the coating films was then reported as the sum of each stain resistance score. The higher the sum of each stain resistance score, the better the stain resistance.

Ranking Standard for Stain Resistance Score for Each Stain

| Stain resistance score | Stain removal |
| --- | --- |
| 10 | No stain or trace stain (<1%) left |
| 9 | 90% to 99% stain removed |
| 8 | 80% to 89% stain removed |
| 7 | 70% to 79% stain removed |
| 6 | 60% to 69% stain removed |
| 5 | 50% to 59% stain removed |
| 4 | 40% to 49% stain removed |
| 3 | 20% to 39% stain removed |
| 2 | 2% to 20% stain removed or obvious stain marks left |
| 1 | Almost no stain (<1%) removed |

VOCs Emission Test (1) Chamber Test Method for the Emission Test

A 60 L chamber (V-60 from Simplewell Technology) was used for the VOCs emission test. The chamber condition was as follows: temperature: 23° C.±2° C.; humidity: 50%±10%; pressure: 10-20 Pa higher than standard atmospheric pressure; and air exchange rate: 0.5 hour$^{-1}$. 16 g of a paint formulation was applied to a 25 cm*25 cm glass, then this glass was put in the chamber. The flow rate from outlet of the chamber was 500 mL/min. At the predetermined sampling point, Tenax TA cartridges (60/80, glass tube, Gerstel) were employed, and the sampling time was 30 minutes (flow rate: 200 mL/min, precisely measured using a flow meter). The total volume collected by the Tenax cartridge was 6 L. The Tenax TA cartridge was then analyzed immediately by a TDS GC-MS instrument for VOCs study. Conditions of the TDS GC-MS instrument were as follows, (2) TDS-GC-MS Parameters A Gerstel thermo desorption system with TDS autosampler was coupled with an Agilent GC 7890-MSD 5975C.

GC Column: RXI-5MS column (30 m×0.25 mm, 0.5 μm film); Carrier gas: helium carrier gas at 1.0 mL/min constant flow; and GC Oven program: 50° C., holding for 10 minutes, 5° C./min ramp to 250° C., holding for 5 minutes.

TDS parameters: A Gerstel cold injection system 4 (CIS-4) with programmable temperature vaporizing (PTV) injector was used for cryo-focusing the analytes prior to transferring the analytes to the analytical GC column. The temperature for TDS was from 20° C. (hold for 1 min) to 280° C. at 60° C./min (hold for 15 min). CIS-4 programming was from −150° C. (equilibration time: 1 min) to 280° C. at 12° C./s (hold for 5 min). Temperature of GC-MS transfer line was 280° C. Mass Spectrometry Detector (MSD) parameters (scan mode): MS Source temperature: 230° C., MS Quad temperature: 150° C., Acquire Mode: Scan, Mass 29-370 Da.

$^1$H NMR Analysis

For each aqueous dispersion to be tested, 15 ml hexane was added into 5 g of the dispersion sample. The resultant mixture was shaken overnight. Then the hexane phase was separated and dried by N$_2$ purge. The residue of dried hexane phase was sent for NMR analysis. $^1$H NMR measurement was conducted to quantify the amount of polyalkylene oxides (PAOs) in the extracted hexane phase and reported as the value of Extracted PAOs % by weight based on the total amount of PAOs in the aqueous dispersion. The amount of PAOs by percentage in the polymeric particles of the aqueous dispersion was then calculated by subtracting the Extracted PAOs value from 100%. Triphenyl phosphine (PPh3) was selected as the internal standard. A mixture of 21.2 mg of PPh3 and 31.47 mg of OA-25 was used as the standard sample for Comp Ex C and Ex 1 dispersions in Table 2. A mixture of 32.9 mg of PPh3 and 25.8 mg of OSP-32 was used as the standard sample for Comp Ex F and Ex 2 dispersions in Table 2. A mixture of 24.7 mg of PPh3 and 26.8 mg of OSP-46 was used as the standard sample for Comp Ex G and Ex 3 dispersions in Table 2. Acetone-D6 was used as the solvent.

Comparative (Comp) Ex A

Firstly, a monomer mixture was prepared by mixing 424.11 g of deionized (DI) water, 45.08 g of FES-32 surfactant (31%), 373.74 g of MMA, 561.50 g of EHA, 602.37 g of St, 45.88 g of AM, 23.81 g of PEM, and 17.56 g of MEU.

Into a 1 gallon vessel, equipped with a reflux condenser, addition funnels and a stirrer, an initial charge of 876.26 g of DI water was added with agitation at 130 revolutions per minute (rpm). The reaction vessel was heated to 85° C. 7.19 g of FES-32 surfactant (31%) was added into the vessel. 98.00 g of the monomer mixture and an initial catalyst solution (6.40 g of APS in 17.53 g of DI water) were charged to the reaction vessel. The reaction mixture was held for 5 minutes for seed formation at 82-88° C. Then the remainder of the monomer mixture, a catalyst (3.36 g of APS in 101.65 g of DI water) were added over a period of 150 minutes with temperature between 84° C. and 86° C. After completing addition of the monomer mixture and the catalyst, the contents in the reaction vessel were cooled to room temperature. During cooling, a mixture of 1.63 g of t-BHP in 21.91 g of DI water, and 0.86 g of IAA in 21.91 g of DI water was added when the temperature was at 65° C. When the vessel temperature reached 50° C. or below, 21.73 g of ammonia (25% aqueous) was added to adjust the pH of the obtained dispersion over 7 to give an aqueous dispersion. The obtained dispersion contained polymeric particles having the composition: 23.47MMA/35.16EHA/37.76ST/1.00AM/1.50PEM/1.11MEU, % by weight based on the total weight of monomers.

Comp Ex B

Comp Ex B was prepared according to the same procedure as described above in preparing Comp Ex A dispersion except that 174.78 g of OSP-150 was added to the monomer mixture. The obtained dispersion contained polymeric particles having the composition: 23.47MMA/35.16EHA/37.76ST/1.00AM/1.50PEM/1.11MEU//11.00OSP-150, % by weight based on the total weight of monomers.

Comp Ex C

OA-25 was added, in an amount of 11% by weight based on the solids weight of Comp Ex A binder, into Comp Ex A dispersion at room temperature with stirring for 30 minutes. A portion of OA-25 was immediately observed to be bleeding out of the surface (that is, oil-like droplets of OA-25 floated on the surface). The resultant blend composition was evaluated for MFFT.

Comp Ex D

Comp Ex A dispersion was mixed with 11% of OE-400, by weight based on the solids weight of Comp Ex A dispersion, at room temperature with stirring for 30 minutes. The resultant blend composition was evaluated for MFFT.

Comp Ex E

Comp Ex A dispersion was mixed with 11% of Texanol, by weight based on the solids weight of Comp Ex A dispersion, at room temperature with stirring for 30 minutes. The resultant blend composition was evaluated for MFFT.

Comp Ex F

OSP-32 (250 mg) was added into 5 g of Comp Ex A dispersion with stirring for 30 minutes at room temperature.

Comp Ex G

OSP-46 (250 mg) was added into 5 g of Comp Ex A dispersion with stirring for 1 hour at room temperature.

Example (Ex) 1

Ex 1 was prepared according to the same procedure as described above in preparing Comp Ex B dispersion except that OSP-150 used in Comp Ex B was replaced by OA-25. The obtained dispersion contained polymeric particles having the composition 23.47MMA/35.16EHA/37.76ST/1.00AM/1.50PEM/1.11MEU//11.00OA-25, % by weight based on the total weight of monomers.

Ex 2

Ex 2 was prepared according to the same procedure as described above in preparing Comp Ex B dispersion except that OSP-150 used in Comp Ex B was replaced by OSP-32. The obtained dispersion contained polymeric particles having the composition of 23.47MMA/35.16EHA/37.76ST/1.00AM/1.50PEM/1.11MEU//11.00OSP-32, % by weight based on the total weight of monomers.

Ex 3

Ex 3 was prepared according to the same procedure as described above in preparing Comp Ex B dispersion except that OSP-150 used in Comp Ex B was replaced by OSP-46. The obtained dispersion contained polymeric particles having the composition: 23.47MMA/35.16EHA/37.76ST/1.00AM/1.50PEM/1.11MEU//11.00OSP-46, % by weight based on the total weight of monomers.

Properties of the resultant dispersions are shown in Tables 1 and 2.

TABLE 1

Physical properties of aqueous dispersions

| Aqueous dispersion | Measured Tg, ° C. | pH | Particle size, nm | Solids, % | Viscosity, cps |
|---|---|---|---|---|---|
| Comp Ex A | 26.3 | 8.43 | 106 | 47.5 | 504 |
| Comp Ex B | 7.8 | 8.43 | 112 | 48.8 | 382 |
| Ex 1 | 4.7 | 7.96 | 116 | 48.5 | 786 |
| Ex 2 | 4.4 | 8.63 | 121 | 48.6 | 602 |
| Ex 3 | 5.6 | 8.67 | 108 | 48.7 | 430 |

Table 2 gives $^1$H NMR analysis results of the amount of PAOs in dispersions made by cold-blending process and polymerization process, respectively. Extracted PAOs represent PAOs present in the aqueous medium of an aqueous dispersion.

TABLE 2

Polyalkylene oxides in aqueous dispersions

| Sample | Composition | Extracted PAOs/%* | PAOs in polymeric particles/%* |
|---|---|---|---|
| Comp Ex C | Comp Ex A/OA-25 blend | 51.63 | 48.37 |
| Comp Ex F | Comp Ex A/OSP-32 blend | 82.47 | 17.53 |
| Comp Ex G | Comp Ex A/OSP-46 blend | 83.36 | 16.64 |
| Ex 1 | Addition of OA-25 during polymerization | 12.46 | 87.54 |
| Ex 2 | Addition of OSP-32 during polymerization | 3.2 | 96.8 |
| Ex 3 | Addition of OSP-46 during polymerization | 2.6 | 97.4 |

*by weight based on the total weight of PAOs in an aqueous dispersion.

The above dispersions were divided into two groups, Group I and Group II, and evaluated for film formation properties.

Group I dispersions were evaluated and results are shown in Table 3. As shown in Table 3, Comp Ex A dispersion alone provided a MFFT of about 27.2° C. and films formed therefrom showed severely cracks. When OA-25 was cold blended into Comp Ex A, lots of oil-like droplets were observed floating on the surface, which indicates that cold blending is not an efficient way to make a homogenous and stable binder or paint system. In addition, the composition of Comp Ex C by cold blending of Comp Ex A dispersion with OA-25 at the same loading provided higher MFFTs than those compositions made by blending Comp Ex A dispersion with Texanol ester alcohol or OE-400 as a coalescent (Comp Exs D and E). In contrast, when OA-25 was added during polymerization process in preparing a dispersion, the resulting dispersion of Ex 1 was homogenous and very stable and gave much lower MFFT than Comp Ex C, which indicates that in-process addition of OA-25 is more efficient in decreasing MFFT than cold blending of OA-25 with Comp Ex A dispersion.

TABLE 3

Compositions and properties of Group I dispersions

| Group I samples | Dispersion appearance | MFFT of dispersion/° C. |
|---|---|---|
| Comp Ex A | Homogenous and stable emulsion | 27.2 |
| Ex 1 | Homogenous and stable emulsion | 6.1 |
| Comp Ex C | Oil-like droplets floating on the surface | 13.8 |
| Comp Ex D | Homogenous and stable emulsion | 6.2 |
| Comp Ex E | Homogenous and stable emulsion | 10.6 |

Group II dispersions were investigated to determine influences of different types of polyalkylene oxides on film formation properties and results are given in Table 4. The appearance of the resultant films were visually observed by the naked eye. Exs 1 and 2 dispersions both formed homogenous and continuous films at room temperature. Ex 3 dispersion also formed continuous films at room temperature. In contrast, Comp Ex B dispersion failed to form continuous films (lots of cracks were observed). In this round of test, Ex 1 dispersion was taken as a control to calibrate the performances of other dispersion with different polyalkylene oxides. The results demonstrated that Comp Ex B dispersion showed higher MFFT and undesirable film formation property as compared to Exs 1-3 dispersions.

TABLE 4

Properties of Group II dispersions

| Group II samples | Dispersion appearance | MFFT/ ° C. | Film formation |
|---|---|---|---|
| Ex 1* | Homogenous and stable emulsion | 11.8 | Homogenous and continuous film formed at RT |
| Ex 2 | Homogenous and stable emulsion | 13.9 | Homogenous and continuous film formed at RT |
| Ex 3 | Homogenous and stable emulsion | 21.4 | Continuous film formed at RT |
| Comp Ex B | Homogenous and stable emulsion | 33.1 | Severely cracking film formed at RT (failed to form continuous film) |

*There was ~5° C. variation for MFFT tests using different equipment as tests conducted in Table 3.

Clear Coating Compositions

Clear coating compositions, Clear Coating 2, Clear Coating 4 and Clear Coating 5, were prepared by mixing different binders with thickeners with or without a coalescent, based on formulations given in Table 5. 1-day and 9-day Koenig hardness and water resistance properties of clear films made from these coating compositions were measured according to the test method described above. As shown in Table 5, Texanol ester alcohol containing coating composition exhibited the highest Koenig hardness that further increased upon aging for 9 days due to the evaporation of Texanol ester alcohol (Clear Coating #2). The composition comprising Ex 1 dispersion showed significantly higher Koenig hardness than the composition comprising Comp Ex A and OE-400 (Clear Coating #4), which did not increase with time indicating almost no coalescent evaporation. Therefore, the composition comprising Ex 1 dispersion showed benefits over the composition comprising OE-400 in Koenig hardness. The results also showed that the composition comprising Ex 1 dispersion without addition of a coalescent demonstrated much better water whitening resistance as compared to the compositions comprising Comp Ex A as a binder with Texanol ester alcohol and OE-400 as coalescents, respectively.

TABLE 5

Clear coating compositions and properties

| Sample NO. | Clear Coating #2 | Clear Coating #4 | Clear Coating #5 |
|---|---|---|---|
| Binder Type | Ex 1 dispersion | Comp Ex A dispersion | Comp Ex A dispersion |
| Weight of Binder/g | 100 | 95.04 | 95.04 |
| Coalescent Type | 0 | OE-400 | Texanol |
| Weight of Coalescent/g | 0 | 4.97 | 4.97 |
| Thickener Type | RM-8W | RM-8W | RM-8W |
| Weight of Thickener/g | 0.3 | 0.3 | 0.3 |
| Properties | | | |
| 1-day Koenig hardness/s | 13 | 7 | 16 |
| 9-day Koenig hardness/s | 13 | 7 | 22 |
| Water whitening resistance | 3 | 1 | 1 |

Paint Formulations

The paint formulations of Comp Paint A-I, Comp Paint A-II and Paint-1 were prepared based on formulations given in Table 6. The paint formulations were made through a two-stage process. Firstly, the ingredients in the grind stage were mixed with high speed dispersing (2,000 rpm) for 2-4 hours to get a well dispersed slurry. Then the ingredients in the letdown stage were added into the slurry. The obtained paint formulations were evaluated for properties according to the test methods described above and results are given in Table 6.

For paint formulations of Comp Paint A-I and Comp Paint A-II, a non-volatile OE-400 coalescent and a commonly used high VOC coalescent Texanol, respectively, were used together with Comp Ex A dispersion to help film formation. Paint-1 comprising Ex 1 dispersion without a coalescent demonstrated good film formation property as indicated by the formation of homogenous and continuous films.

TABLE 6

Paint formulations

| Material, gram | Comp Paint A-I | Comp Paint A-II | Paint-1 |
|---|---|---|---|
| Grind | | | |
| Water | 151.50 | 151.50 | 151.50 |
| Natrosol 250 HBR | 2.00 | 2.00 | 2.00 |
| NaOH (15%) | 1.00 | 1.00 | 1.00 |
| TERGITOL EF-406 | 2.00 | 2.00 | 2.00 |

TABLE 6-continued

Paint formulations

| Material, gram | Comp Paint A-I | Comp Paint A-II | Paint-1 |
|---|---|---|---|
| OROTAN 1288 | 6.00 | 6.00 | 6.00 |
| Rhodoline FT-100 | 6.00 | 6.00 | 6.00 |
| Nopco NXZ | 1.00 | 1.00 | 1.00 |
| Ti-Pure R-706 | 220.00 | 220.00 | 220.00 |
| Celite 499 | 10.00 | 10.00 | 10.00 |
| CC-700 | 60.00 | 60.00 | 60.00 |
| ASP 170 | 60.00 | 60.00 | 60.00 |
| DB-80 | 80.00 | 80.00 | 80.00 |
| Grind Sub-total | 599.50 | 599.50 | 599.50 |
| LetDown | | | |
| Binder Type/Dosage | Comp Ex A dispersion/ 293.70 g | Comp Ex A dispersion/ 293.70 g | Ex 1 dispersion/ 323.20 g |
| OE-400 | 17.20 | | |
| Texanol | | 17.20 | |
| ROPAQUE Ultra E | 40.00 | 40.00 | 40.00 |
| Nopco NXZ | 2.00 | 2.00 | 2.00 |
| ACRYSOL TT-935 (50%) | 2.62 | 2.56 | 2.56 |
| NaOH (15%) | 0.50 | 0.50 | 0.50 |
| KATHON LXE | 1.00 | 1.00 | 1.00 |
| Water | 43.48 | 43.54 | 31.24 |
| Total | 1000.00 | 1000.00 | 1000.00 |

To evaluate VOC contribution of Ex 1 dispersion to a paint formulation, emission tests were also carried out on the above paint formulations. Results are given in Table 7. Paint-1 comprising the OA-25-containing dispersion of Ex 1 released less VOCs than the OE-400-containing paint formulation (Comp Paint A-I), which indicates that Ex 1 dispersion was more environmentally friendly than OE-400 for applications in waterborne coatings. Other properties of these paint formulations were also measured and results are given in Table 7. Paint-1 showed comparable contrast ratio, whiteness, gloss, scrub resistance, and stain resistance properties as compared to Texanol ester alcohol or OE-400 containing paints (Comp Paint A-I and Comp Paint A-II).

TABLE 7

Properties of paints with different plasticizers/coalescents

| Performance | | Comp Paint A-I | Comp Paint A-II | Paint-1 |
|---|---|---|---|---|
| C.R./% | | 96.6 | 96.3 | 96.7 |
| Y value/% | | 90.6 | 90.5 | 90.6 |
| Gloss/20° | | 1.3 | 1.3 | 1.3 |
| Gloss/60° | | 3.4 | 3.2 | 3.4 |
| Gloss/85° | | 12.2 | 11.5 | 12.4 |
| Scrub resistance/% | | 100 | 106 | 102 |
| Stain resistance | | 67 | 63 | 64 |
| TVOC (mg/m³) | 4 hours | 2.26 | n.d. | 0.16 |
| | 24 hours | 0.57 | n.d. | 0.47 |
| | 48 hours | 0.50 | n.d. | 0.04 |
| | 72 hours | 1.80 | n.d. | 0.4 |
| | 168 hours | 0.14 | n.d. | 0.21 |

What is claimed is:

1. An aqueous dispersion of polymeric particles comprising an emulsion polymer and a polyalkylene oxide with a weight average molecular weight in the range of 450 to 1,500 g/mole,
wherein the emulsion polymer comprises structural units of an ethylenically unsaturated phosphorous acid monomer and/or a salt thereof,
wherein the polyalkylene oxide has the structure of formula (I), $$R_1-O-(AO)_m-R_2 \qquad (I),$$

where $R_1$ and $R_2$ each independently represent a hydrogen atom or a straight, branched or cyclic, saturated or unsaturated alkyl group having from 1 to 22 carbon atoms; AO represents an oxybutylene unit or a combination of an oxybutylene unit with an oxypropylene unit; and m is an integer of from 5 to 23; and
wherein the amount of the polyalkylene oxide in the polymeric particles is 50% or more, by weight based on the total weight of polyalkylene oxides in the aqueous dispersion.

2. The aqueous dispersion of claim 1, wherein the polyalkylene oxide in the polymeric particles is present in an amount of from 0.5% to 30%, by weight based on the weight of the emulsion polymer.

3. The aqueous dispersion of claim 1, wherein the polyalkylene oxide has a weight average molecular weight of from 500 to 1,000 g/mole.

4. The aqueous dispersion of claim 1, wherein at least one of $R_1$ and $R_2$ is an alkyl group having from 4 to 12 carbon atoms, and m is from 5 to 15.

5. The aqueous dispersion of claim 1, wherein the amount of the polyalkylene oxide in the polymeric particles is 70% or more, by weight based on the total weight of polyalkylene oxides in the aqueous dispersion.

6. The aqueous dispersion of claim 1, wherein the polymeric particles have a minimum film formation temperature less than 23° C.

7. The aqueous dispersion of claim 1, wherein the emulsion polymer comprises from 0.1% to 10% of structural units of the ethylenically unsaturated phosphorous acid monomer and/or salt thereof, by weight based on the weight of the emulsion polymer.

8. The aqueous dispersion of claim 1, wherein the ethylenically unsaturated phosphorous acid monomer is selected from the group consisting of phosphoethyl (meth)acrylate, phosphopropyl (meth)acrylate, phosphobutyl (meth)acrylate, and mixtures thereof.

9. The aqueous dispersion claim 1, wherein the emulsion polymer further comprises from 0.1% to 5% of structural units of an ethylenically unsaturated monomer carrying at least one functional group selected from the group consisting of amide, carboxyl, carboxylic anhydride, sulphonate, sulphate, and mixtures thereof, by weight based on the weight of the emulsion polymer.

10. The aqueous dispersion of claim 1, wherein the polymeric particles have a measured Tg of from −20 to 50° C.

11. The aqueous dispersion of claim 1, wherein the polymeric particles have a particle size of from 60 to 200 nm.

12. The aqueous dispersion of claim 1, being formed by emulsion polymerization of monomers in an aqueous medium in the presence of the polyalkylene oxide, wherein the monomers comprise the ethylenically unsaturated phosphorous acid monomer and/or salt thereof.

13. A process of preparing an aqueous dispersion of polymeric particles, comprising:
polymerizing monomers in an aqueous medium in the presence of a polyalkylene oxide to obtain the aqueous dispersion of polymeric particles, wherein the monomers comprise an ethylenically unsaturated phosphorous acid monomer and/or a salt thereof, wherein the polyalkylene oxide with a weight average molecular weight in the range of 450 to 1,500 g/mole has the structure of formula (I),

where $R_1$ and $R_2$ each independently represent a hydrogen atom or a straight, branched or cyclic, saturated or unsaturated alkyl group having from 1 to 22 carbon atoms; AO represents an oxybutylene unit or a combination of an oxybutylene unit with an oxypropylene unit; and m is an integer of from 5 to 23; and wherein the amount of the polyalkylene oxide in the polymeric particles is 50% or more by weight based on the total weight of polyalkylene oxides in the aqueous dispersion.

14. An aqueous coating composition, comprising the aqueous dispersion of polymeric particles of claim 1.

15. The aqueous coating composition of claim 14, further comprising from zero to less than 2% of a coalescent, by weight based on the dry weight of the aqueous dispersion of polymeric particles.

* * * * *